United States Patent
Powell et al.

(10) Patent No.: US 7,955,031 B2
(45) Date of Patent: Jun. 7, 2011

(54) MATERIAL SUPPLY SYSTEM AND METHOD

(75) Inventors: Ricky Charles Powell, Ann Arbor, MI (US); Andrew Kelly Gray, Perrysburg, OH (US); Todd Alden Coleman, Wayne, OH (US)

(73) Assignee: First Solar, Inc., Perrysburg, OH (US)

( * ) Notice: Subject to any disclaimer, the term of this patent is extended or adjusted under 35 U.S.C. 154(b) by 1319 days.

(21) Appl. No.: 11/423,871

(22) Filed: Jun. 13, 2006

(65) Prior Publication Data

US 2007/0007109 A1 Jan. 11, 2007

Related U.S. Application Data

(60) Provisional application No. 60/696,522, filed on Jul. 6, 2005.

(51) Int. Cl.
*B65G 53/40* (2006.01)
(52) U.S. Cl. ............ 406/75; 406/93; 406/155; 198/391; 198/392
(58) Field of Classification Search .................... 406/51, 406/75, 93, 155, 194; 198/391, 392; 222/52, 222/77
See application file for complete search history.

(56) References Cited

U.S. PATENT DOCUMENTS

| | | | | |
|---|---|---|---|---|
| 3,618,828 A | * | 11/1971 | Schinella | 222/163 |
| 4,071,151 A | * | 1/1978 | Farber | 414/187 |
| 4,395,665 A | | 7/1983 | Buchas | |
| 4,558,805 A | | 12/1985 | Margison | |
| 4,579,482 A | * | 4/1986 | Gastaldi et al. | 406/32 |
| 4,708,534 A | * | 11/1987 | Gallant | 406/75 |
| 4,963,392 A | | 10/1990 | Molnar et al. | |
| 5,327,947 A | * | 7/1994 | McGregor | 141/71 |
| 5,964,551 A | * | 10/1999 | Wallace | 406/32 |
| 6,322,628 B1 | | 11/2001 | Wallace | |
| 6,715,640 B2 | | 4/2004 | Tapphorn | |
| 7,273,075 B2 | * | 9/2007 | Tapphorn et al. | 141/2 |
| 2002/0020461 A1 | | 2/2002 | Platsch | |

FOREIGN PATENT DOCUMENTS

| | | |
|---|---|---|
| EP | 0 234 779 | 9/1987 |
| GB | 920 790 | 3/1963 |

* cited by examiner

*Primary Examiner* — Douglas A Hess
(74) *Attorney, Agent, or Firm* — Dickstein Shapiro LLP

(57) ABSTRACT

A system and a method for feeding a solid into a solid deposition system is described. Solid contained in a hopper is directed into a vibratory bowl. The frequency of the vibrations of the vibratory bowl can be modulated by a feedback system. The solid can then be entrained in a carrier gas which can flow to a distributor for deposition on a substrate.

21 Claims, 5 Drawing Sheets

MATERIAL SUPPLY SYSTEM AND METHOD

CLAIM OF PRIORITY

This application claims priority under 35 U.S.C. §119(e) to U.S. Provisional Patent Application Ser. No. 60/696,522 filed Jul. 6, 2005, the entire contents of which is hereby incorporated by reference.

TECHNICAL FIELD

The present invention relates to systems and methods for supplying material.

BACKGROUND

In the semiconductor field, semiconductor solids are deposited on a substrate to allow for the formation of a semiconductor film. The semiconductor solid is entrained in a carrier gas to allow for even deposition. Precisely controlling the feed rate of the solid allows the solid to be deposited slowly providing uniform formation of very thin semiconductor films because input solid rates determine the film thickness. To avoid problems associated with pulsing, vibratory feeders are employed.

SUMMARY

In one aspect, a method for delivering a solid includes directing a solid from a supply reservoir up a ramp to a divider, and separating the solid into a return portion and an output portion.

In another aspect, a loading system includes a powder supply, a vacuum system, a fill port configured to deliver powder into the vacuum system, and a vibratory feeder.

In another aspect, a vibratory bowl includes a supply reservoir, a divider, and a ramp having a first end adjacent to the supply reservoir and a second end adjacent to the divider.

In another aspect, a vibratory feeder includes the vibratory bowl, a hopper configured to contain a solid, an inlet having a first end adjacent to the hopper and a second end adjacent to the vibratory bowl, and an outlet having a first end adjacent to the exit pathway of the vibratory bowl and the a second end leading to an exit of the vibratory feeder. The vibratory bowl and the hopper can be in a sealed vessel configured to be operated under vacuum.

In another aspect, a vibratory feeder includes a vibratory bowl, an accelerometer configured to monitor the vibratory bowl, a hopper configured to contain a solid, an inlet having a first end adjacent to the hopper and a second end adjacent to the vibratory bowl, and an outlet having a first end adjacent to the exit pathway of the vibratory bowl and the a second end leading to an exit of the vibratory feeder. The vibratory bowl includes a supply reservoir and a ramp having a first end adjacent to the supply reservoir and a second end adjacent to an exit pathway.

In another aspect, a vibratory feeder includes a vibratory bowl, a hopper configured to contain a solid, an inlet having a first end adjacent to the hopper and a second end adjacent to the vibratory bowl, an outlet having a first end adjacent to the exit pathway of the vibratory bowl and the a second end leading to an output conduit of the vibratory feeder, and an optical detection system configured to monitor the output conduit. The vibratory bowl includes a supply reservoir and a ramp having a first end adjacent to the supply reservoir and a second end adjacent to an exit pathway.

The ramp can be a spiral ramp. The ramp can have a slope of 1° to 15°, for example, 2° to 10°.

The divider can divide the second end of ramp into a return side and an exit side.

In certain embodiments, the bowl can include a return pathway having a first end adjacent to the return side of the divider and a second end adjacent to the supply reservoir. The bowl can include an exit pathway having a first end adjacent to the exit side of the divider and a second end leading to the exit of the vibratory bowl. The exit pathway can include a carrier gas inlet. The exit pathway of the vibratory bowl can be adjacent to a catch funnel connected to an output conduit. The supply reservoir can be a portion of a vibratory bowl.

The output portion of the solid can exit the ramp via an exit pathway. The solid can exit the ramp at a rate of about 0.1 to 50 grams/minute. The solid can be moved from a reserve into the supply reservoir. The return portion can be returned to the supply reservoir via a return pathway. The carrier gas flow can be from 0.2 to 3000 slpm.

In certain embodiments, the method can include entraining the output portion of the solid in a carrier gas. In other embodiments, the method can include flowing a carrier gas at the exit pathway, directing the solid entrained in the carrier gas toward a substrate, or reducing the pressure inside the supply reservoir, or combinations thereof.

The vibratory feeder can include an accelerometer and vibration excitation unit configured to control and monitor the vibratory bowl motion. The vibration excitation unit can generate frequencies of greater than 10 Hz. The vibration excitation unit can generate frequencies of less than 1000 Hz, for example, frequencies of 20 Hz to 200 Hz.

In certain embodiments, the vibratory feeder can include a hopper oscillator configured to vibrate the hopper. In other embodiments, the vibratory feeder can include a detection system configured to monitor the output conduit. For example, the detection system can include a collection cell adjacent to the output conduit.

The sealed vessel can include a carrier gas inlet. The sealed vessel can include a load valve.

The details of one or more embodiments are set forth in the accompanying drawings and the description below. Other features, objects, and advantages will be apparent from the description and drawings, and from the claims.

DETAILED DESCRIPTION

A vibratory feeder can permit feeding of a solid at a precise rate. The feed rates of this vibratory feeder can be significantly lower than those which can be achieved by commercially available vibratory feeders. Through the act of dividing the solid into two portions and returning one portion to the supply reservoir of a vibratory bowl, the sensitivity of feed rate to vibration amplitude can be adjusted. A feedback system including an accelerometer provides precise control of the amplitude and frequency of vibrations applied to the vibratory bowl.

Figure 1:
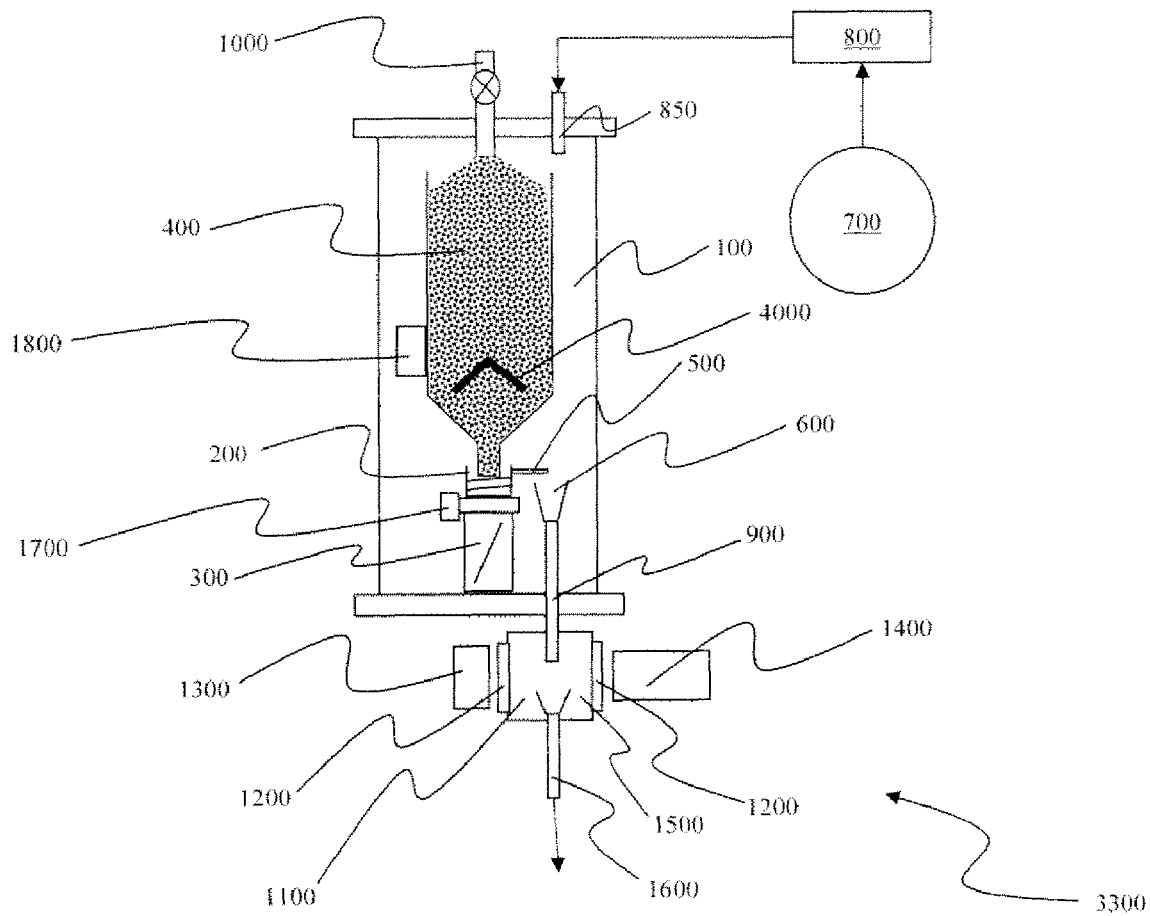
FIG. 1 is a drawing depicting a vibratory feeder system.
Figure 3:
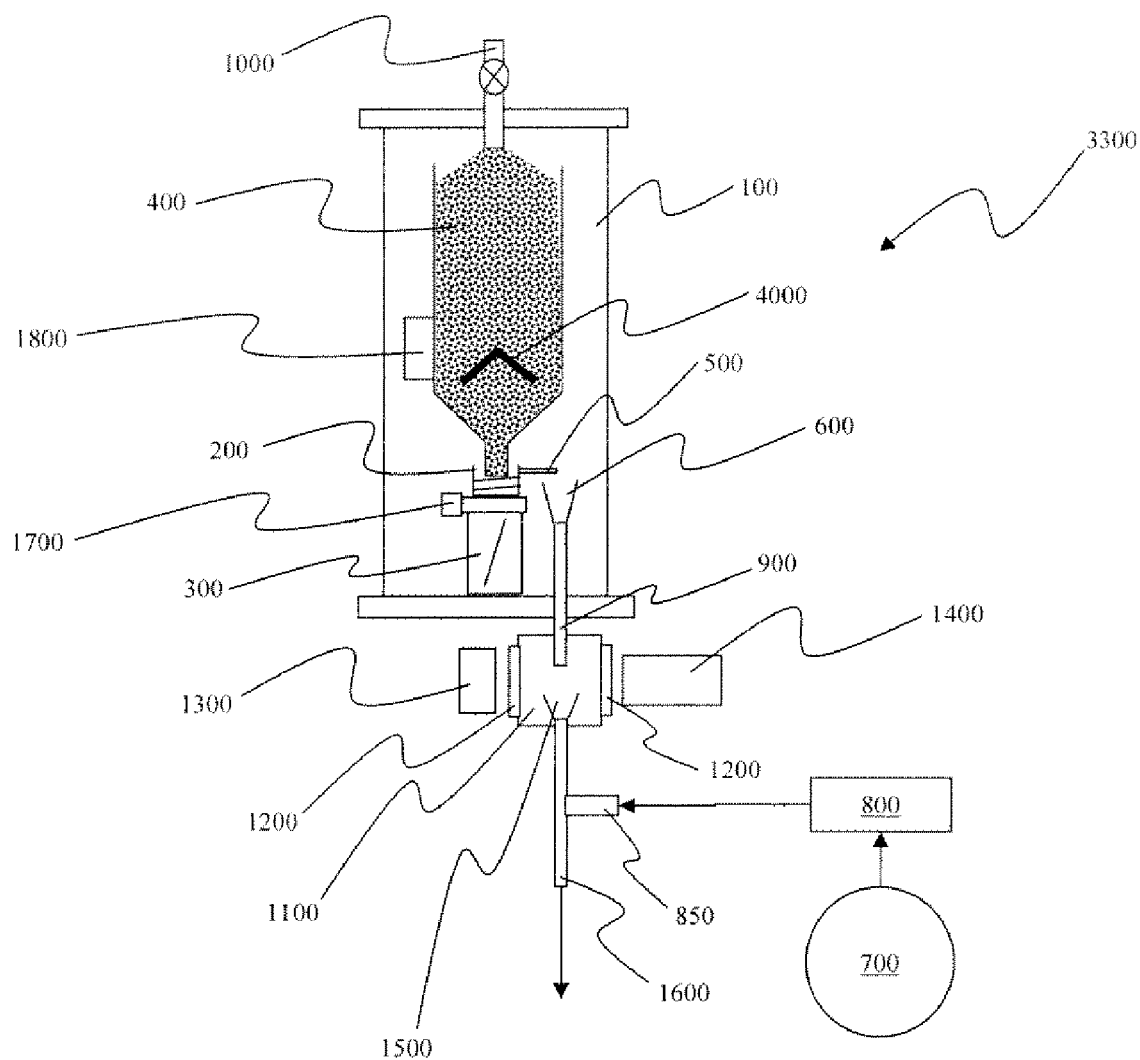
FIG. 3 is a drawing depicting a vibratory feeder system.

Referring to FIGS. 1 and 3, a solid is contained within a hopper 400 located over a vibratory bowl 200. Hopper 400 can include a support baffle 4000 to support the weight of powder in hopper 400 and prevent packing of the solid in hopper 400. Vibratory bowl 200 can be spring mounted. The solid moves from hopper 400 into a supply reservoir (not shown) included in vibratory bowl 200. The solid can be divided into two portions: a return portion and an output portion. The return portion travels back into the supply reservoir (not shown) while the output portion exits vibratory bowl 200 into a processing system. The processing system can be a semiconductor coating system, for example, a thin film deposition system described in U.S. Pat. No. 6,037,241 to Powell et al. titled "Apparatus and method for depositing a semiconductor material"; U.S. Patent Application Nos. 60/674,676, 60/674,677, 60/674,683, and 60/675,078, all titled "System and method for depositing a material on a substrate," each of which is incorporated by reference in its entirety.

The solid can be a powder such as a semiconductor powder, for example, a transition metal (Group 12) and a chalcogenide (Group 18) such as cadmium sulfide or cadmium telluride. Powders can include a plurality of particles having average sizes in a range of, for example, 75 to 600 micrometers. Additional materials that can be utilized to form a semiconductor film may be used with these systems and methods. Dopants may also be useful to enhance the deposition and properties of the deposited product.

Vibratory bowl 200 and hopper 400 are contained within a vessel 100. Vessel 100 can be sealed so that a vacuum can be achieved within it. Vessel 100 can include a load valve 1000 which can allow for continuous operation of a vibratory feeder. The end of hopper 400 adjacent to vibratory bowl 200 can be shaped to direct the solid into a supply reservoir (not shown), for example, as a funnel or pipe. The movement of solid in hopper 400 is typically by the influence of gravity only but may be augmented by additional vibration. To prevent the solid from agglomerating, a hopper oscillator 1800 can be attached to hopper 400 which can vibrate hopper 400 intermittently with pulse sequences between 1 and 100 times per hour. The pulse sequences can include between 1 and 1000 individual pulses for example a short burst of vibrations from a solenoid operating at 1 to 150 Hz.

Figure 2:
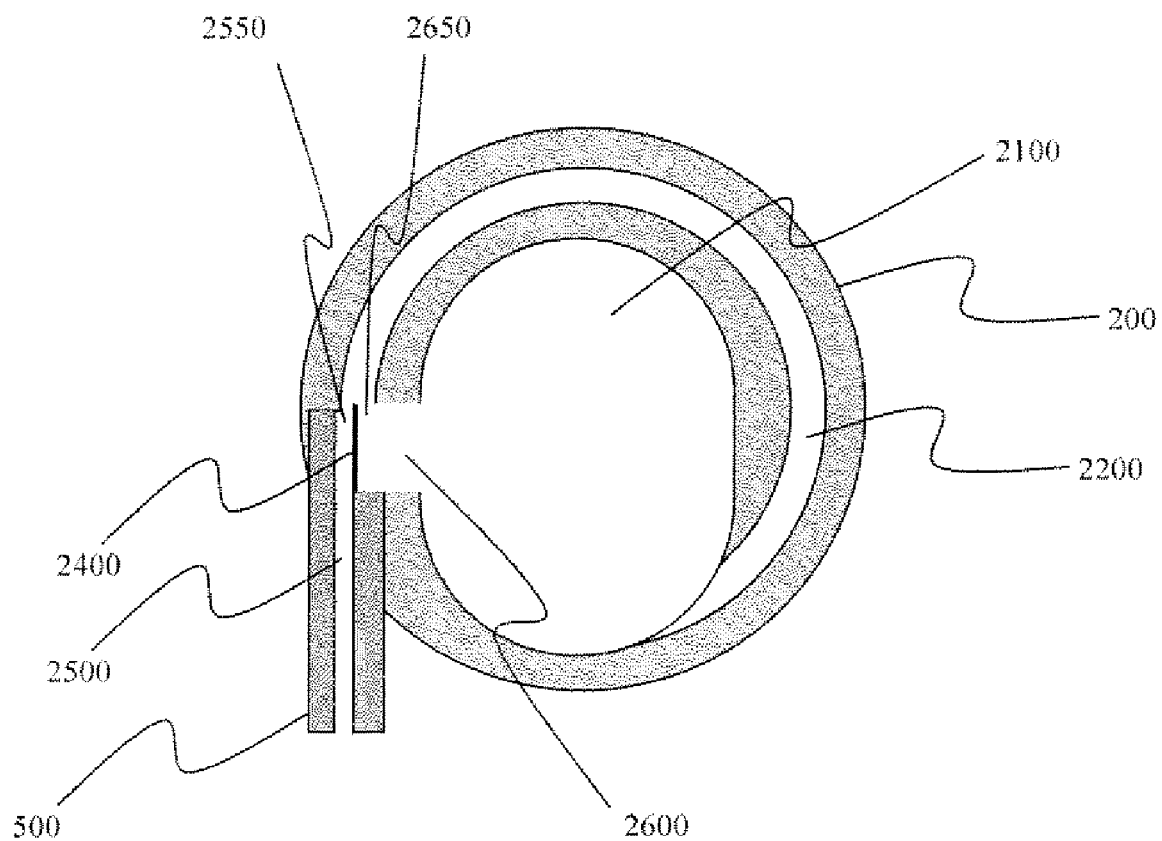
FIG. 2 is a drawing depicting a vibratory bowl.

Referring to FIG. 2, vibratory bowl 200 has a supply reservoir 2100 where the solid is collected from a hopper (not shown). The solid is directed up a ramp 2200 from supply reservoir 2100 to a divider 2400 in response to movement, such as a vibration, which can be applied to vibratory bowl 200 by a vibration excitation unit (not shown). Ramp 2200 which is located inside vibratory bowl 200 can have a length greater than the distance between supply reservoir 2100 and divider 2400, for example, a spiral ramp as shown in FIG. 2, or another configuration such as an s-curve, a zig-zag, or a straight line. Additionally ramp 2200 can have a slope between 1° and 15°, for example, a slope at 5°. Divider 2400 divides exit conduit assembly 500 into a return side 2650 and an exit side 2550 and separates the solid into a return portion and an output portion. Divider 2400 can be knife-edged and can be a tube or wiper. Divider 2400 is used to generate a return portion which can reduce the sensitivity of the feed rate to vibration amplitude. The return portion travels on return pathway 2600 from return side 2650 back into supply reservoir 2100. The output portion travels on exit conduit assembly 500 from exit side 2550 to the exit of vibratory bowl 200.

Referring to FIGS. 1 and 3, an accelerometer 1700 can be configured to monitor vibratory bowl 200 and to control the vibration amplitude in vibratory bowl 200 through a feedback system. Vibration excitation unit 300 can be driven with a variable frequency drive that accepts input from accelerometer 1700 such as a REO-VIB MFS-168 (http://www.reousa.com/products/mathand.html). Accelerometer 1700 and vibration excitation unit 300 can generate controlled vibrations with frequencies of greater than 10 Hz and less than 1000 Hz, for example, frequencies of 20 Hz to 200 Hz. Vibration excitation unit 300 can include a solenoid. Commercially available excitation units can be utilized, for example, units from Calvibes (http://www.calvibes.com/vibratory.html) or Texas Airsonics (Spirofeed model 500-050A http://www.texasairsonics.com/Products.html). Vibration frequencies can be adjusted to work near but not at the mechanical resonance of the system to avoid sensitivity of small changes in resonance frequency that can result from changes in mass loading due to variable fill height in the hopper.

Exit conduit assembly 500 of vibratory bowl 200 can be adjacent to a catch funnel 600 such that the output portion passes through exit conduit assembly 500 where it is collected by catch funnel 600. The output portion can pass through exit conduit assembly 500 at a rate of 0.1 to 50 grams/min. The solid proceeds through an output conduit 900 and into an observation cell 1100. Observation cell 1100 can be an optical observation cell. Observation cell 1100 can include windows 1200 to allow light from a light source 1300 to pass through observation cell 1100 to a camera attached to a vision system 1400 to monitor the solid within observation cell 1100. A vision based system in which pictures of the solid either moving in output conduit 900 prior to dropping into observation cell 1100 or dropping past a window 1200 of observation cell 1100 can be employed to determine the solid flow rate, as described for example, for JM Canty systems (http://www.jmcanty.com/overview/V.Vector/98a7563.pdf). The illumination for the vision system can be a strobe with a pulse frequency near the vibration excitation frequency. Inside observation cell 1100 is a collector funnel 1500 which is attached to an output 1600 to allow the solid to flow through and eventually be deposited on a substrate.

Figure 4:
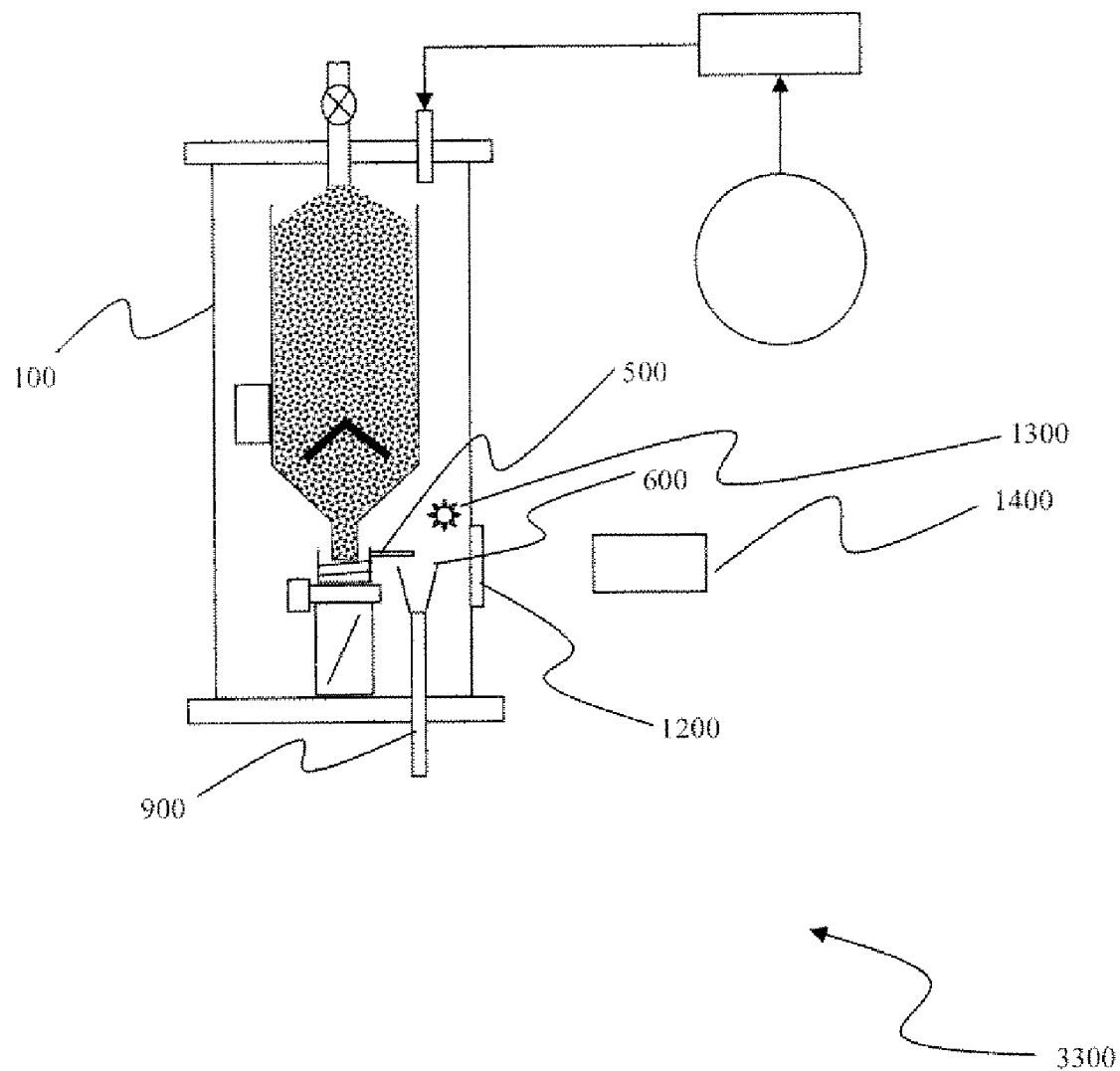
FIG. 4 is a drawing depicting a vibratory feeder system.

Alternatively, as shown in FIG. 4, vibratory feeder 3300 can be configured to include a window 1200 included on vessel 100 in the proximity of exit conduit 500. As the solid passes through exit conduit 500, it is illuminated by light source 1300 and observed by vision system 1400 through window 1200. In this manner, the solid flow rate can be monitored before the solid enters catch funnel 600 and exits vessel 100 through output conduit 900.

FIGS. 1 and 3 differ in the placement of a carrier gas inlet 850. In FIG. 1, carrier gas inlet 850 is a conduit connecting vessel 100 to carrier gas supply 700. The carrier gas can combine with the solid dropping into exit funnel 600. FIG. 3 depicts an alternate embodiment where output conduit 1600 includes carrier gas inlet 850. The carrier gas does not combine with the solid until after it has passed through observation cell 1100. As shown in FIGS. 1 and 3, a powder stream can be entrained in a carrier gas and move to a deposition system which can deposit the powder on a substrate. A gas supply 700 can be regulated by a carrier gas mass flow controller 800. A carrier gas such as, for example, helium which has been found to increase the glass temperature range and the pressure range that provide film characteristics such as deposition density and good bonding, can be introduced into vessel 100 through a carrier gas inlet 850. Alternatively, the carrier gas can be another gas such as nitrogen, neon, argon or krypton, or combinations of these gases. It is also possible for the carrier gas to include an amount of a reactive gas such as oxygen that can advantageously affect growth properties of the material. Carrier gas mass flow controller 800 can be an electronic mass flow controller. Carrier gas flow ranges can be from 0.1 to 50 slpm, for example 0.2 to 20 slpm, for feeding into vacuum sublimation processes. The present system could be capable of operation at almost any higher flow rate. For example, flows used in thermal spray systems of 60 to 3000 slpm are attainable.

The vibratory feeder can be part of a solid loading system. The loading system can reload the vibratory feeder, apply a vacuum, and allow for continuous operation of the vibratory feeder. Once a low powder condition is detected, the load hopper can be vented, reloaded, and evacuated, or solid can be pneumatically transferred into the load hopper. The powder can then be drained into the vibratory feeder.

Figure 5:
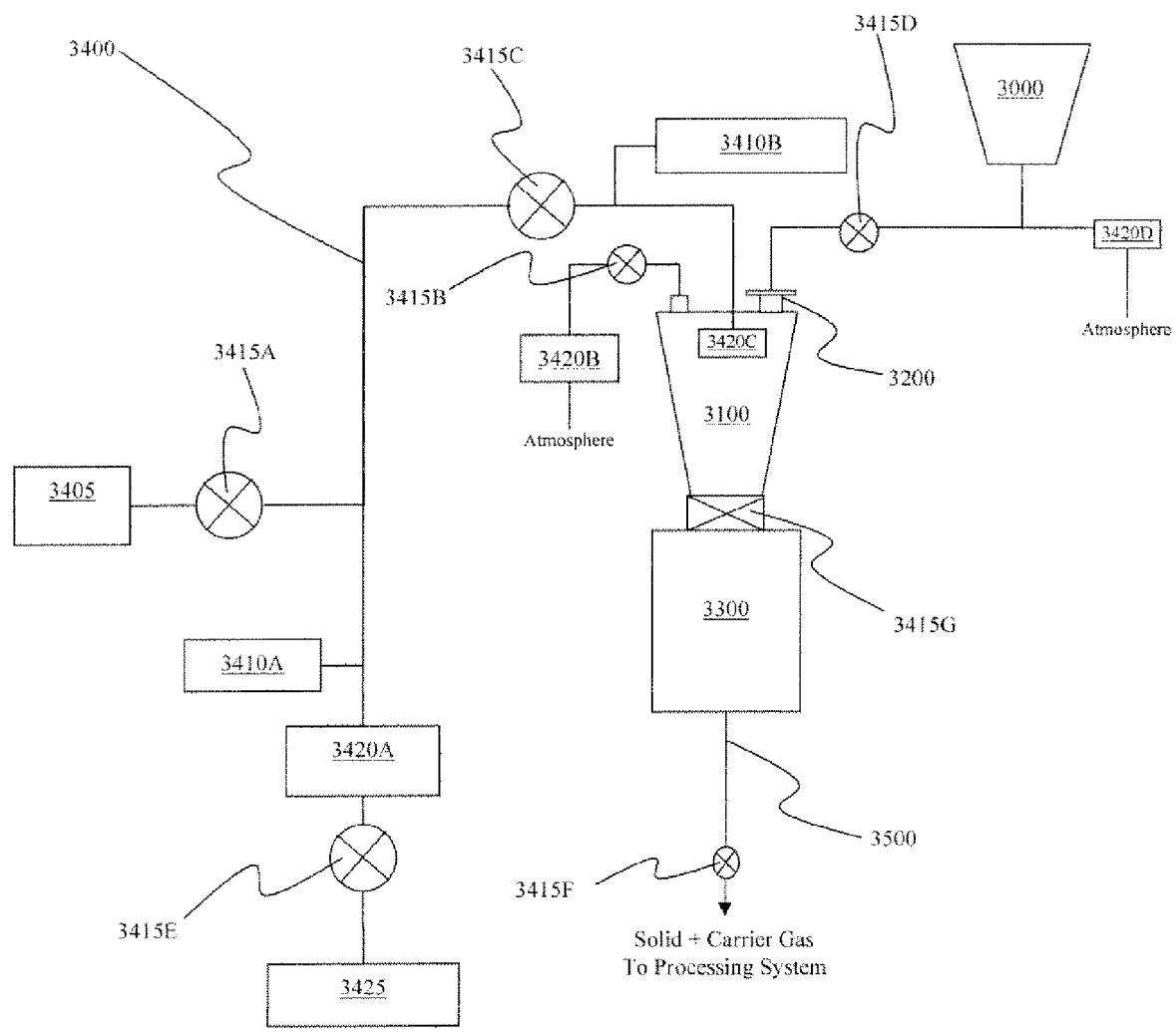
FIG. 5 is a schematic diagram depicting a loading system.

In FIG. 5, the loading system can include a solid supply 3000, a vacuum system 3400, and a fill port 3200 that can deliver solid into vacuum system 3400 and ultimately into vibratory feeder 3300, for example, into load hopper 3100. This system can allow for replenishment of vibratory feeder 3300 without feed interruption. Vacuum system 3400 can include: a vacuum 3405; pressure sensors 3410A and 3410B; valves 3415A, 3415B, 3415C, 3415D, 3415E, and 3415G; filters 3420A, 3420C; and a dry (oil-free) pump 3425. Valve 3415C located between load hopper 3100 and vacuum 3405 allows vacuum system 3400 to be maintained even when load hopper 3100 is vented. Pressure sensor 3410B can monitor the pressure inside of load hopper 3100. Filter 3420C prevents powder that may be pneumatically transported into load hopper 3100 or entrained during pump down from moving into vacuum system 3400. Valve 3415B allows load hopper 3100 to be vented to an external atmosphere. Filter 3420B is located between valve 3415B and an external atmosphere. Valve 3415G located between load hopper 3100 and vibratory feeder 3300 allows for continuous operation during reloading. Valve 3415D located between solid supply 3000 and load hopper 3100 allows load hopper 3100 to be refilled with solid through fill port 3200. Filter 3420D is located between solid supply 3000 and an external atmosphere. Valve 3415A isolates vacuum 3405 from the rest of vacuum system 3400. Pressure sensor 3410A can monitor the pressure of vacuum system between valves 3415E, 3415A, and 3415C. Filter 3420A is located between valves 3415E, 3415A, and 3415C and protects vacuum pump 3425. Vacuum system 3400 maintains vacuum during reload through the use of valves 3415A, 3415B, 3415C, 3415D, 3415G, and vacuum 3405. Valves 3415A, 3415B, 3415C, 3415D, 3415E, 3415F, and 3415G can be of a variety of types including but not limited to ball valves or dome valves with inflatable seals. Vacuum 3405 can be, for example, a HEPA vacuum. Dry pump 3425 can be, for example, a Scroll pump.

Solid supply 3000 is connected to load hopper 3100 through fill port 3200. Load hopper 3100 can be further connected to a hopper (not shown) within vibratory feeder 3300. Fill port 3200 and load hopper 3100 allow reloading of vibratory feeder 3300 and thereby allow for continuous operation of the equipment. If a low solid condition is detected by any method including an optical sensor, load hopper 3100 can be vented, reloaded, and evacuated. The solid can then be gravity drained into vibratory feeder 3300. Refilling load hopper 3100 can also be accomplished using pneumatic transfer of the solid.

The solid entrained within the carrier gas exits vibratory feeder 3300 and travels in a conduit 3500 to a processing system (not shown). The rate at which the solid exits conduit 3500 can be in the range of 0.1 to 50 grams/minute, for example, 0.25 grams/minute. Valve 3415F is located between conduit 3500 and the processing system. The solid can then be directed toward a substrate where it can be deposited.

Other embodiments are within the scope of the following claims.

What is claimed is:
1. A vibratory feeder, comprising:
  a vibratory bowl, comprising:
    a supply reservoir,
    a divider configured to adjust feed rate sensitivity to vibration amplitude,
    and
    a ramp having a first end adjacent to the supply reservoir and a second end adjacent to the divider;
  a hopper configured to contain a solid;
  an inlet having a first end adjacent to the hopper and a second end adjacent to the vibratory bowl;
  a vibration excitation unit configured to impart a vibration on the vibratory bowl and
  an outlet having a first end adjacent to the exit pathway of the vibratory bowl and a second end leading to an exit of the vibratory feeder.

2. The vibratory feeder of claim 1, wherein the ramp is a spiral ramp.

3. The vibratory feeder of claim 1, wherein the divider divides the second end of ramp into a return side and an exit side.

4. The vibratory feeder of claim 3, further comprising a return pathway having a first end adjacent to the return side of the divider and a second end adjacent to the supply reservoir.

5. The vibratory feeder of claim 3, further comprising an exit pathway having a first end adjacent to the exit side of the divider and a second end leading to the exit of the vibratory bowl.

6. The vibratory feeder of claim 5, wherein the exit pathway of the vibratory bowl is adjacent to a catch funnel connected to an output conduit.

7. The vibratory feeder of claim 6, further comprising a detection system configured to monitor the output conduit.

8. The vibratory feeder of claim 7, wherein the detection system includes an collection cell adjacent to the output conduit.

9. The vibratory feeder of claim 1, wherein the ramp has a slope of 1° to 15°.

10. The vibratory feeder of claim 9, wherein the ramp has a slope of 2° to 10°.

11. The vibratory feeder of claim 1, wherein the vibration excitation unit generates frequencies of greater than 10 Hz.

12. The vibratory feeder of claim 1, wherein the vibration excitation unit generates frequencies of less than 1000 Hz.

13. The vibratory feeder of claim 1, wherein the vibration excitation unit generates frequencies of 20 Hz to 200 Hz.

14. The vibratory feeder of claim 1, wherein the vibratory bowl and the hopper are in a sealed vessel configured to be operated under vacuum.

15. The vibratory feeder of claim 14, wherein the sealed vessel includes a carrier gas inlet.

16. The vibratory feeder of claim 14, wherein the exit pathway includes a carrier gas inlet.

17. The vibratory feeder of claim 14, wherein the sealed vessel includes a load valve.

18. The vibratory feeder of claim 1, further comprising a hopper oscillator configured to vibrate the hopper.

19. The vibratory feeder of claim 1, wherein the hopper includes a support baffle.

20. A vibratory feeder, comprising:
  a vibratory bowl, comprising:
    a supply reservoir, and
    a ramp having a first end adjacent to the supply reservoir and a second end adjacent to an exit pathway;
    an accelerometer configured to monitor the vibratory bowl;

a hopper configured to contain a solid;

an inlet having a first end adjacent to the hopper and a second end adjacent to the vibratory bowl; and an outlet having a first end adjacent to the exit pathway of the vibratory bowl and the a second end leading to an exit of the vibratory feeder.

21. A vibratory feeder, comprising:

a vibratory bowl, comprising:

a supply reservoir, a divider configured to adjust feed rate sensitivity to vibration amplitude, and a ramp having a first end adjacent to the supply reservoir and a second end adjacent to an exit pathway;

a hopper configured to contain a solid;

an inlet having a first end adjacent to the hopper and a second end adjacent to the vibratory bowl;

a vibration excitation unit configured to impart a vibration on the vibratory bowl;

an outlet having a first end adjacent to the exit pathway of the vibratory bowl and the a second end leading to an output conduit of the vibratory feeder; and an optical detection system configured to monitor the output conduit.

* * * * *